(12) United States Patent
Lin et al.

(10) Patent No.: US 8,671,988 B2
(45) Date of Patent: Mar. 18, 2014

(54) FLUID FLOW CONTROL MEMBERS FOR USE WITH VALVES

(75) Inventors: Chun Lin, McKinney, TX (US); Eric Alan Miller, McKinney, TX (US); Roy Ronald Pelfrey, Sherman, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 810 days.

(21) Appl. No.: 12/467,152

(22) Filed: May 15, 2009

(65) Prior Publication Data

US 2010/0051120 A1    Mar. 4, 2010

Related U.S. Application Data

(63) Continuation-in-part of application No. 12/402,076, filed on Mar. 11, 2009, now abandoned, which is a continuation-in-part of application No. 12/202,876, filed on Sep. 2, 2008.

(51) Int. Cl.
*F16K 39/02* (2006.01)

(52) U.S. Cl.
USPC ..................................... 137/630.15; 137/630

(58) Field of Classification Search
USPC ......... 137/219–222, 460, 462, 466, 498, 504, 137/599.2, 628, 630, 630.14, 630.15, 630.2, 137/630.022, 543.21; 251/259
See application file for complete search history.

(56) References Cited

U.S. PATENT DOCUMENTS

| | | | |
|---|---|---|---|
| 750,321 A * | 1/1904 | Thompson | 137/630.14 |
| 1,298,849 A * | 4/1919 | Wolff | 137/630.15 |
| 1,867,195 A | 7/1932 | Teller | |
| 2,534,697 A * | 12/1950 | Bruestle | 137/492 |
| 2,630,137 A | 3/1953 | Krone et al. | |
| 2,638,924 A * | 5/1953 | St Clair | 137/565.35 |
| 2,710,019 A | 6/1955 | Reasoner et al. | |
| 3,078,875 A * | 2/1963 | Farrell et al. | 137/630.15 |
| 3,439,711 A | 4/1969 | Sherwood et al. | |
| 3,469,605 A * | 9/1969 | Courtot et al. | 137/630 |
| 3,631,893 A * | 1/1972 | Seaman et al. | 137/630 |

(Continued)

FOREIGN PATENT DOCUMENTS

DE    1257506    12/1967

OTHER PUBLICATIONS

Patent Cooperation Treaty, Written Opinion of the International Searching Authority, issued by the International Searching Authority in connection with related PCT application No. PCT/US2009/053817, mailed Nov. 18, 2009 (8 pages).

(Continued)

*Primary Examiner* — Craig Schneider
*Assistant Examiner* — Craig J Price
(74) *Attorney, Agent, or Firm* — Hanley, Flight and Zimmerman, LLC

(57) ABSTRACT

Fluid flow control members for use with valves are described. An example poppet apparatus for use with an internal valve includes first and second opposing seating surfaces to control fluid flow through the internal valve. Additionally, the example poppet apparatus includes an aperture to receive a stem of the internal valve. Further, the example poppet apparatus includes a flow diverter to divert fluid flow through the poppet apparatus to substantially prevent the fluid flow from compressing a spring to be at least partially positioned in the poppet apparatus.

18 Claims, 13 Drawing Sheets

(56) References Cited

U.S. PATENT DOCUMENTS

| | | | |
|---|---|---|---|
| 3,631,894 A | 1/1972 | Frantz | |
| 3,844,312 A | 10/1974 | Sumner et al. | |
| 4,026,327 A | 5/1977 | Deinlein-Kalb | |
| 4,121,617 A | 10/1978 | Masek | |
| 4,825,895 A * | 5/1989 | Maltman | 137/219 |
| 5,236,014 A | 8/1993 | Buls et al. | |
| 7,926,784 B2 | 4/2011 | Fleming | |
| 8,146,885 B2 * | 4/2012 | Lin et al. | 251/258 |
| 2003/0041905 A1 | 3/2003 | Andersson | |
| 2010/0051117 A1 | 3/2010 | Lin et al. | |

OTHER PUBLICATIONS

Patent Cooperation Treaty, International Search Report, issued by the International Searching Authority in connection with related PCT application No. PCT/US2009/053817, mailed Nov. 18, 2009 (4 pages).

Patent Cooperation Treaty, Written Opinion of the International Searching Authority, issued by the International Searching Authority in connection with related PCT application No. PCT/US2009/053819, mailed Nov. 18, 2009 (6 pages).

Patent Cooperation Treaty, International Search Report, issued by the International Searching Authority in connection with related PCT application No. PCT/US2009/053819, mailed Nov. 18, 2009 (3 pages).

Patent Cooperation Treaty, Written Opinion of the International Searching Authority, issued by the International Searching Authority in connection with related PCT application No. PCT/US2009/053820, mailed Nov. 18, 2009 (9 pages).

Patent Cooperation Treaty, International Search Report, issued by the International Searching Authority in connection with related PCT application No. PCT/US2009/053820, mailed Nov. 18, 2009 (4 pages).

United States Patent and Trademark Office Non-Final Office Action issued in connection with U.S. Appl. No. 12/202,876, mailed on Nov. 16, 2011, 5 pages.

United States Patent and Trademark Office, Notice of Allowance, issued in connection with U.S. Appl. No. 12/202,876, mailed on May 2, 2012, 14 pages.

Chinese State Intellectual Property Office, Second Office Action, issued in connection with Chinese Application No. 200980143481.9, mailed on Mar. 21, 2013, 16 pages.

Patent Cooperation Treaty, Written Opinion of the International Searching Authority, issued by the International Searching Authority in connection with related PCT application No. PCT/US2009/053820, mailed on Nov. 18, 2009 (9 Pages).

Patent Cooperation Treaty, International Search Report, issued by the International Searching Authority in connection with related PCT application No. PCT/US2009/053820, mailed on Nov. 18, 2009 (4 Pages).

United States Patent and Trademark Office, Non-Final Office Action, issued in connection with U.S. Appl. No. 12/467,152, mailed on Apr. 25, 2012 (29 Pages).

United States Patent and Trademark Office, Restriction Requirement, issued in connection with U.S. Appl. No. 12/467,152, mailed on Feb. 17, 2012 (8 Pages).

United States Patent and Trademark Office, "non-final Office action," issued in connection with U.S. Appl. No. 13/567,761, mailed on Nov. 12, 2013, 15 pages.

\* cited by examiner

FLUID FLOW CONTROL MEMBERS FOR USE WITH VALVES

RELATED APPLICATIONS

This patent is a continuation-in-part of U.S. patent application Ser. No. 12/402,076, filed on Mar. 11, 2009, which is a continuation-in-part of U.S. patent application Ser. No. 12/202,876, filed on Sep. 2, 2008, both of which are hereby incorporated herein by reference in their entireties.

FIELD OF THE DISCLOSURE

This patent relates generally to fluid flow control members and, more specifically, to fluid flow control members for use with valves.

BACKGROUND

Internal valves are used in a variety of commercial and industrial applications to control fluid flow between a fluid storage container and another container, hose, pipeline, etc. Typically, internal valves are provided with an equalization member to equalize fluid pressure across the valve prior to fully opening the valve. The rate at which the fluid pressure equalizes across the valve is associated with the size of the valve and the fluid flow rate through the equalization member.

To equalize the pressure across known internal valves, these valves are provided with a stem having a cut-away portion or groove that varies the fluid flow rate through the equalization member depending on the position of the cut-away portion or groove relative to an aperture that fluidly couples the valve to the container, hose, pipeline, etc. Specifically, if the cut-away portion or groove is adjacent the aperture, the size of the fluid flow path is relatively large and, in contrast, if the cut-away portion or groove is at a distance from the aperture, the size of the fluid flow path is relatively small.

Different internal valves have different diameter apertures and different size stems. Accordingly, the diameter of the aperture is restricted by the size of the valve, and the amount of material that may be removed from the stem to create the cut-away portion or groove is restricted by the size of the stem. Generally, removing material from a body decreases its structural integrity and, therefore, the amount of material that can be removed from the stem is limited to an amount that enables the structural integrity of the stem to be maintained while providing a fluid flow path to equalize the pressure across the valve. As a result, the speed at which known internal valves can be fully opened is limited by the amount of material that can be removed from the stem.

Additionally, the cut-away portion or groove creates a non-cylindrical surface on the stem. Due to manufacturing tolerances, the stem may rub against the surface defining the aperture as the stem is moved. Unlike smooth cylindrical surfaces, the non-cylindrical surface has edges that may wear a groove(s) in the surface defining the aperture, which decreases the useful life of the valve. Additionally, in some instances, the engagement between these edges and the surface defining the aperture causes the valve to malfunction.

SUMMARY

An example poppet apparatus for use with an internal valve includes first and second opposing seating surfaces to control fluid flow through the internal valve. Additionally, the example poppet apparatus includes an aperture to receive a stem of the internal valve. Further, the example poppet apparatus includes a flow diverter to divert fluid flow through the poppet apparatus to substantially prevent the fluid flow from compressing a spring to be at least partially positioned in the poppet apparatus.

Another example poppet apparatus for use with an internal valve includes a first body having a first seating surface to sealingly engage a second body of the internal valve. The first body defines a second seating surface opposite the first seating surface to sealingly engage a plug of the internal valve, an aperture to receive a stem of the internal valve, and a bore coaxially aligned with the aperture. Additionally, the example poppet apparatus includes a plate coupled to the poppet apparatus. At least one of the plate or the bore define an opening sized to substantially limit fluid flow through the poppet apparatus when a spring seat coupled to the stem is positioned adjacent the opening.

DETAILED DESCRIPTION

Figure 1:
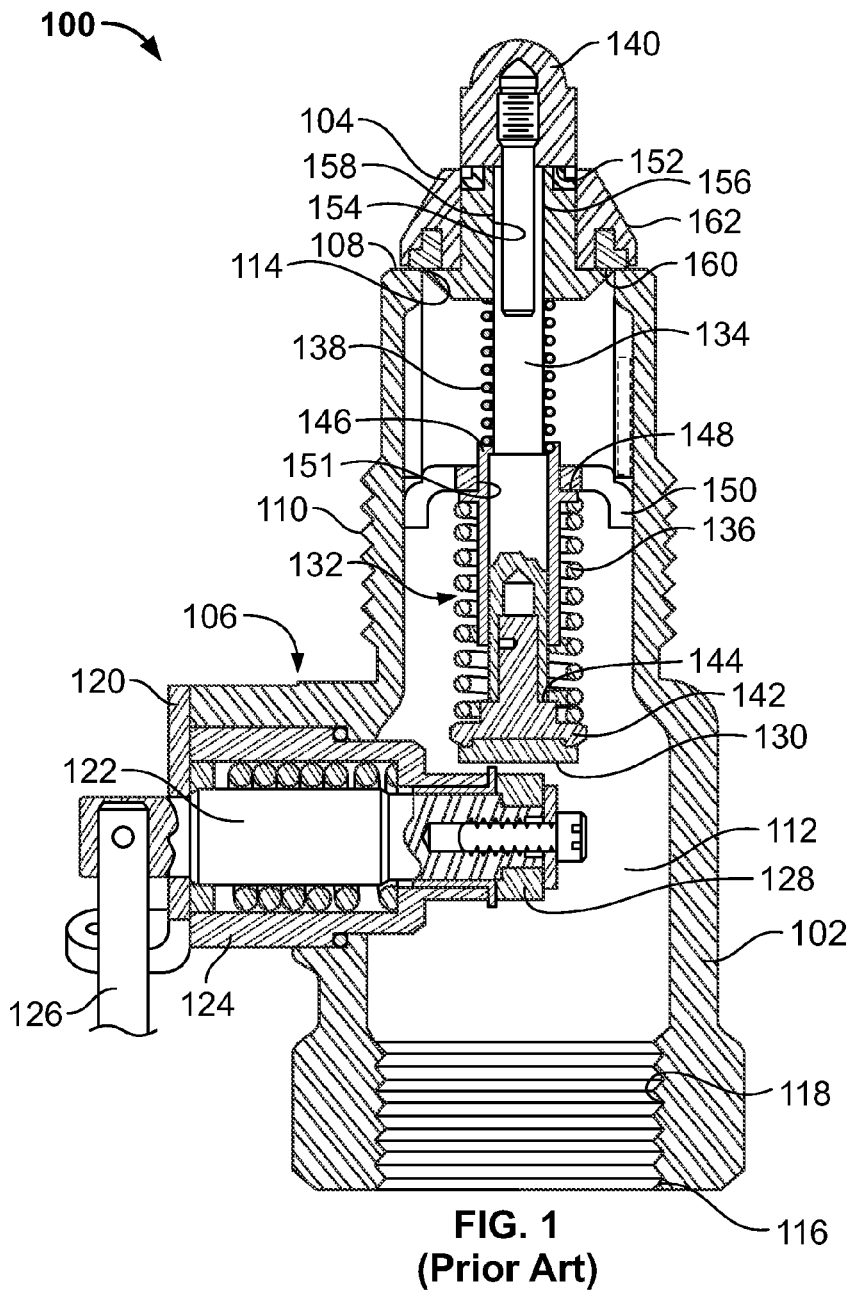
FIG. 1 depicts a known internal valve.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The example poppet and excess flow valve apparatus described herein increase the rate at which, for example, an internal valve may be fully opened. In particular, the example apparatus (e.g., a poppet) is provided with a plurality of fluid flow channels that fluidly couple a chamber of the valve to another chamber, hose, pipeline, etc. Specifically, the plurality of fluid flow channels may have a cross-sectional area that is approximately sixteen times greater than the cross-sectional area provided by a fluid flow channel of known internal valves. As a result, when a seat of the example apparatus disengages a seating surface, fluid may flow rapidly through the plurality of fluid flow channels to quickly equalize the pressure across the valve. Once the pressure is equalized, the valve may be fully opened. Additionally, the example apparatus described herein enables the valve to be implemented using a substantially cylindrical stem, which prevents the problems encountered by known stems (e.g., stems having cut-away portions or grooves) used to implement known internal valves.

The example apparatus may also include a spring seat that engages a surface of, for example, a poppet when the valve is fully open to prevent the flow of fluid through the fluid flows channels, thereby maintaining the proper function of an excess flow valve associated with the poppet. In some examples, the surface is a surface of a sliding member positioned and biased within a bore of the poppet. If a stem of the valve extends further while the spring seat engages the surface, the sliding member slides within the bore to enable, for example, a cam to rotate between 50° and 70° travel, which fully opens the valve. Once the spring seat disengages the surface, a biasing element within the bore returns the sliding member to a rest position.

As described herein, the example apparatus may include a disc retainer that defines an opening sized to limit the fluid flow through a poppet when a spring seat coupled to a valve stem is positioned proximate and/or adjacent the opening. In such examples, the disc retainer may include a symmetrical curved surface that surrounds the opening to guide the spring seat relative to the opening as well as to reduce errors during assembly (i.e., prevent the disc retainer from being installed upside down). Additionally or alternatively, the example apparatus described herein may define a bore that is coaxially aligned with an aperture that receives a valve stem. The bore may be sized to limit the fluid flow through a poppet when a spring seat coupled to a valve stem is positioned proximate and/or adjacent the bore.

As described herein, the example apparatus may further include a flow diverter to divert the flow of fluid around a spring at least partially positioned in a bore of the poppet. Such an approach substantially prevents the flow of fluid through the plurality of fluid flow channels from compressing or otherwise affecting the operation of the spring and, thus, from impacting the operability of the internal valve with which the example apparatus is used.

FIG. 1 depicts a known internal valve 100 that has a body 102, a poppet 104, and a bonnet assembly 106. The bonnet assembly 106 is coupled to the body 102 and the poppet 104 sealingly engages a surface 108 of the body 102 to control fluid flow through the internal valve 100.

The body 102 includes exterior threads 110 that engage an opening (not shown) of a chamber or tank (not shown) such as a pumping system, a stationary storage tank, transport truck, etc. Additionally, the body 102 defines a bore 112 having a first opening 114 and a second opening 116 to fluidly couple the chamber or tank to another chamber, a hose, a pipeline, etc. Specifically, the bore 112 includes internal threads 118 to threadingly engage another body (not shown) such as, for example, a coupling of an LPG hose.

The bonnet assembly 106 is coupled to the body 102 via a plate 120. The bonnet assembly 106 includes a shaft 122 that is partially positioned within and rotationally coupled to a bonnet 124. The shaft 122 includes an external lever 126 to rotate the shaft 122 relative to the bonnet 124 and the body 102. A cam 128 is coupled to the shaft 122 opposite the external lever 126 and is positioned within the bore 112. As the shaft 122 is rotated, the cam 128 engages a surface 130 to move a stem assembly 132 within the bore 112.

The stem assembly 132 includes a stem 134, a first spring 136, a second spring 138 and a plug 140. A first spring seat 142 is coupled to an end 144 of the stem 134 and is positioned opposite a second spring seat 146 that surrounds the stem 134. A surface 148 of the second spring seat 146 engages a guide bracket 150 having an opening 151 that guides the stem 134 relative to the body 102. The first spring 136 is positioned between the first spring seat 142 and the second spring seat 146 and the second spring 138 is positioned between the second spring seat 146 and the poppet 104. The plug 140 is coupled to the stem 134 opposite the first spring seat 142 and engages a seating surface 152 defined by the poppet 104. Additionally, a portion of the stem 134 is positioned within an aperture 154 defined by the poppet 104 adjacent the seating surface 152.

In operation, to equalize a pressure between a chamber or tank in which the internal valve 100 is mounted and the other chamber, hose, pipeline, etc. coupled to the second opening 116, the external lever 126 is rotated to position the cam 128 at a mid-point (e.g., 70° travel), which moves the stem assembly 132 to disengage the plug 140 from the seating surface 152 and positions a cut-away portion or groove 202 (FIG. 2) of the stem 134 adjacent to the aperture 154. As discussed above, positioning the cut-away portion or groove 202 (FIG. 2) adjacent to the aperture 154 increases the size of a fluid flow channel 156 between the stem 134 and a surface 158 of the aperture 154, which enables a relatively large amount of fluid to bleed between the chamber or tank and the other chamber, hose, pipeline, etc. to equalize the pressure across the internal valve 100.

Once the fluid pressure is equalized, the internal valve 100 may be fully opened. Specifically, the external lever 126 may be rotated to position the cam 128 at a high-point, which moves the stem assembly 132 to enable a seating surface 160 of the poppet 104 to disengage the surface 108 to allow fluid to flow from the other chamber, tank, etc. in which the internal valve 100 is mounted through the first opening 114. However, if the fluid flow increases to a magnitude greater than a predetermined fluid flow rate (e.g., an excess flow limit), a force exerted by the fluid flow against an external surface 162 of the poppet 104 overcomes a force exerted by the second spring 138 and causes the seating surface 160 of the poppet 104 to reengage the surface 108 even though the cam 128 is positioned at the high-point. In this position, while the seating surface 160 of the poppet 104 engages the surface 108, the plug 140 is at a distance from the seating surface 152 and a cylindrical portion 204 (FIG. 2) of the stem 134 is positioned adjacent the aperture 154. Positioning the cylindrical portion 204 (FIG. 2) adjacent the aperture 154 decreases the size of the fluid flow channel 156 between the stem 134 and the surface 158 of the aperture 154, which enables a relatively small amount of fluid to bleed between the chamber or tank and the second opening 116.

Figure 3:
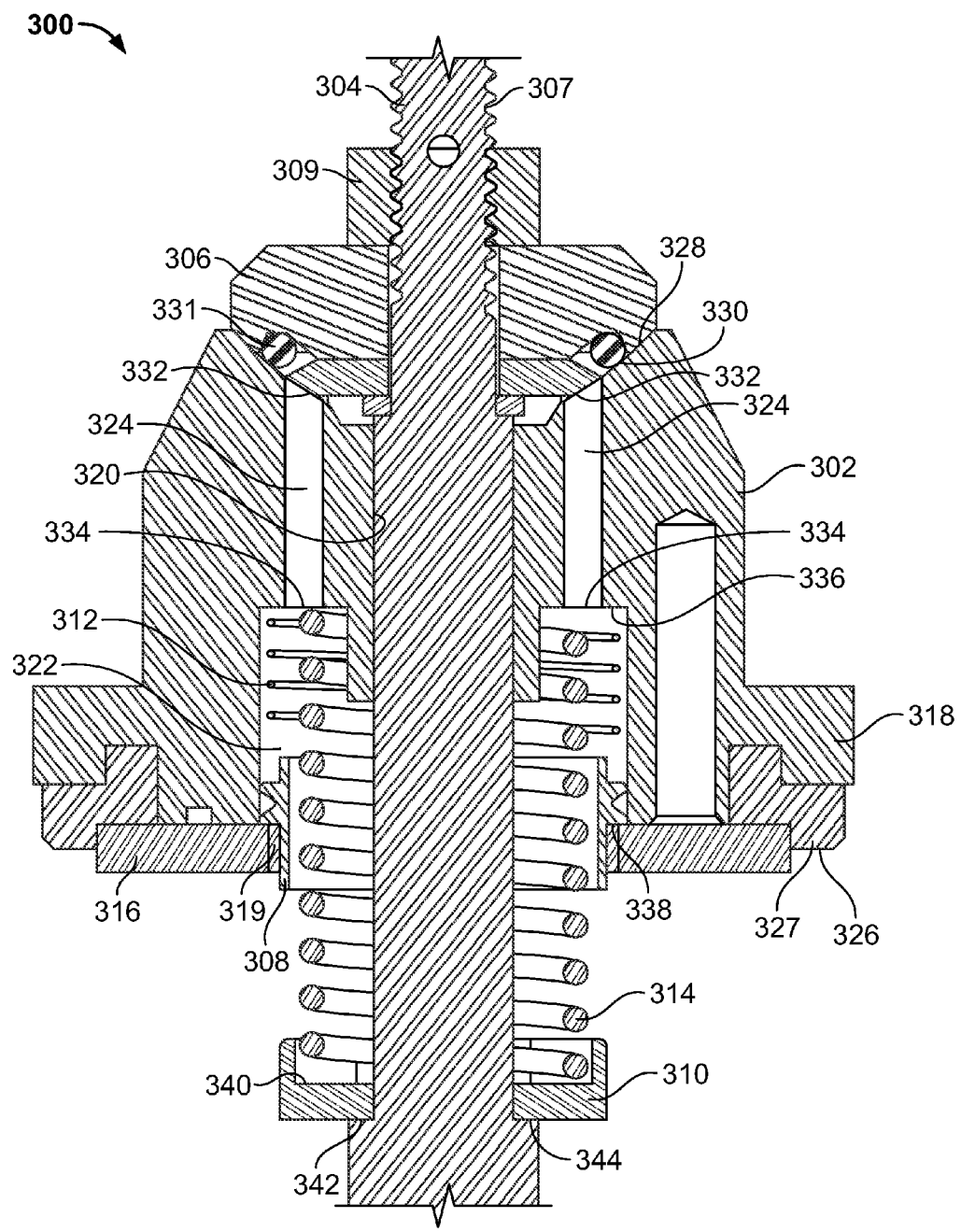
FIG. 3 depicts a portion of an example poppet and excess flow valve assembly in a closed position.

FIG. 3 depicts a portion of an example poppet and excess flow valve assembly or apparatus 300 that may be used in connection with internal valves such as, for example, the internal valve 100. Specifically, as described in more detail below, the assembly 300 may be used in place of the poppet 104, the stem assembly 132, and the plug 140 of FIG. 1. The poppet and excess flow valve assembly 300 includes an example fluid flow control member, poppet or poppet apparatus 302, a stem 304 and a plug 306. The stem 305 includes a threaded end 307 that is threadingly engaged by a nut 309 to position the plug 306 between the nut 309 and the poppet 302. Additionally, the assembly 300 includes a sliding member 308, a spring seat 310, a first biasing element 312, a second biasing element 314 and a plate 316 that is coupled to a body 318 of the poppet 302. The plate 316 includes a lip 319 to position the sliding member 308 within the poppet 302, as discussed below.

The body 318 defines an aperture 320 that receives the stem 304, a bore 322 that is coaxially aligned with the aperture 320 and a plurality of fluid flow channels 324 that may be coaxially aligned with the aperture 320. The plurality of fluid flow channels 324 fluidly couple a chamber of a valve (not shown) to another chamber or vessel such as, for example, a pumping system, a stationary storage tank, a transport truck, or any other suitable chamber, etc. In contrast to the fluid flow channel 156 of FIG. 1, the plurality of fluid flow channels 324 do not significantly impact or impair the structural integrity of the stem 304 or the poppet 302. As a result, a cross-sectional area of the plurality of fluid flow channels 324 may be at least approximately sixteen times greater than the cross-sectional area of the fluid flow channel 156. In other example implementations, the cross-sectional area of the plurality of fluid flow channels 324 may vary depending on the application and/or the size of the valve with which the poppet 302 is used. As discussed in more detail below, providing a relatively larger fluid flow area enables the fluid flow rate through a valve to be significantly increased during opening of the valve, which also increases the rate at which pressure across the valve equalizes and, as a result, the rate in which the valve may be fully opened.

Additionally, the poppet 302 has a first seating surface 326 and a second seating surface 328 that is opposite the first seating surface 326. The first seating surface 326 surrounds the bore 322 and includes a seal, gasket or o-ring 327 that is positioned between the body 318 and the plate 316. In some example implementations, the first seating surface 326 is to sealingly engage the surface 108 (FIG. 1) of the internal valve 100 (FIG. 1) to control fluid flow through the internal valve 100 (FIG. 1). Similarly, the second seating surface 328 is to be sealingly engaged by a seat 330 of the plug 306 having a seal, gasket or o-ring 331. The interaction between the seat 330 and the second seating surface 328 controls fluid flow through the plurality of fluid flow channels 324.

In this example implementation, the fluid flow channels 324 are substantially coaxial with the aperture 320. Additionally, each of the plurality of fluid flow channels 324 has a first opening 332 that is opposite a second opening 334. The first opening 332 is positioned between the aperture 320 and the second seating surface 328, and the second opening 334 is adjacent a surface 336 of the bore 322.

The first biasing element 312 (e.g., a spring) is positioned within the bore 322 between the surface 336 and the sliding member 308 to urge the sliding member 308 away from the body 318. Specifically, the first biasing element 312 drives a surface 338 of the sliding member 308 toward the plate 316. The second biasing element 314 (e.g., a spring) is partially positioned within the bore 322 between the surface 336 and a first surface 340 of the spring seat 310. The second biasing element 314 urges the spring seat 310 away from the body 318 and urges the seat 330 of the plug 306 toward the second seating surface 328. To couple the spring seat 310 to the stem 304, the stem 304 defines a stepped portion 342. The spring seat 310 surrounds the stem 304 and a second surface 344 of the spring seat 310 engages the stepped portion 342.

Figure 4:
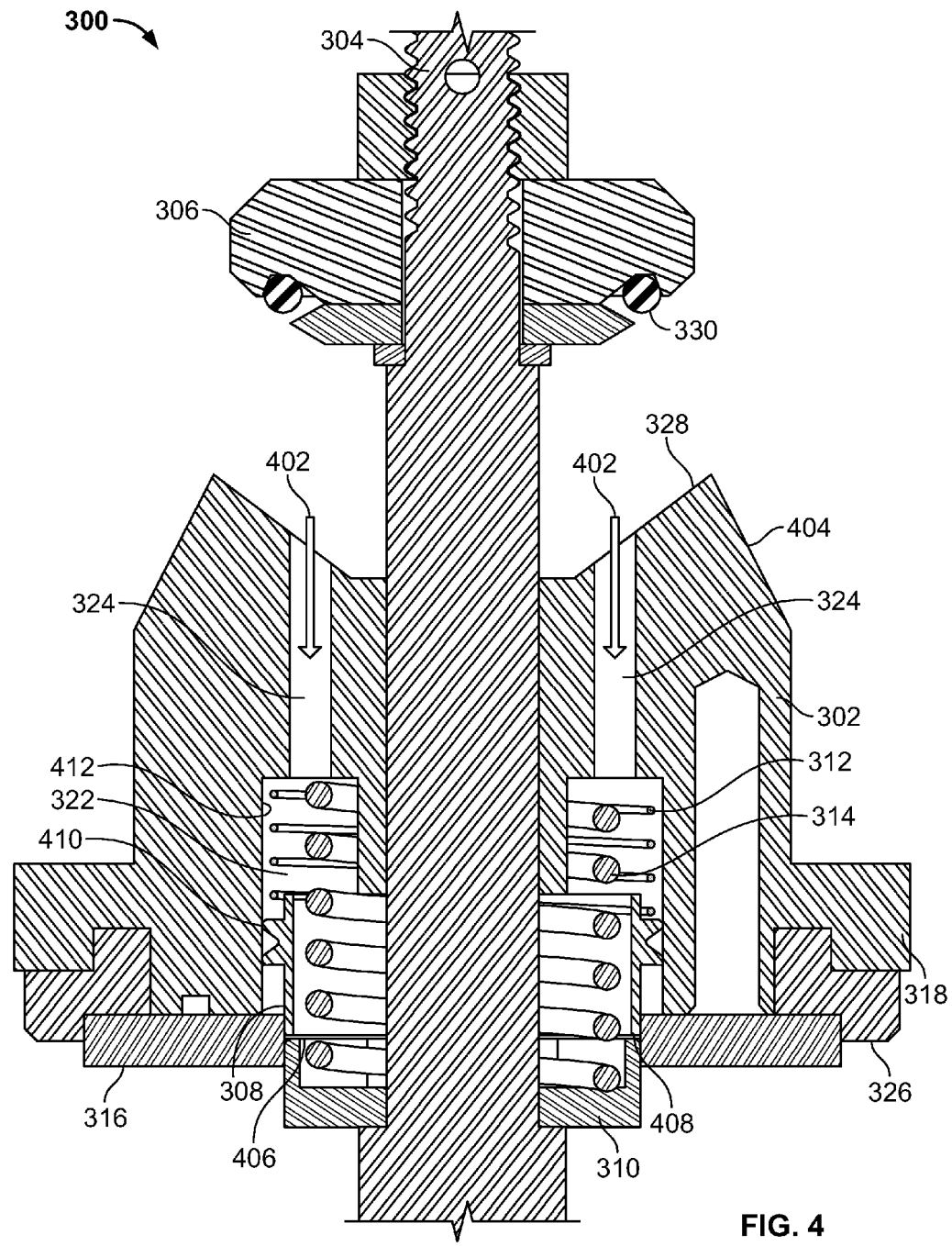
FIG. 4 depicts the portion of the example poppet and excess flow valve of FIG. 3 in an opened position.

In some examples, to equalize the pressure across a valve in which the assembly 300 is mounted (e.g., a valve similar to the internal valve 100 of FIG. 1), the external lever 126 (FIG. 1) is rotated to position the cam 128 (FIG. 1) to the mid-point (e.g., 70° travel), which moves the stem 304 and disengages the seat 330 from the second seating surface 328. The size of the aperture 320 substantially corresponds to the size of the stem 304 to guide the stem 304 relative to the poppet 302. As shown in FIG. 4, once the seat 330 disengages the second seating surface 328, fluid rapidly flows through the plurality of fluid flow channels 324 in a direction generally indicated by arrows 402. As the fluid flows through the plurality of fluid flow channels 324, the pressure across the valve equalizes. However, in other examples, a fluid may flow in a direction substantially opposite the direction indicated by arrows 402 such as, for example, during a fluid backflow.

Figure 2:
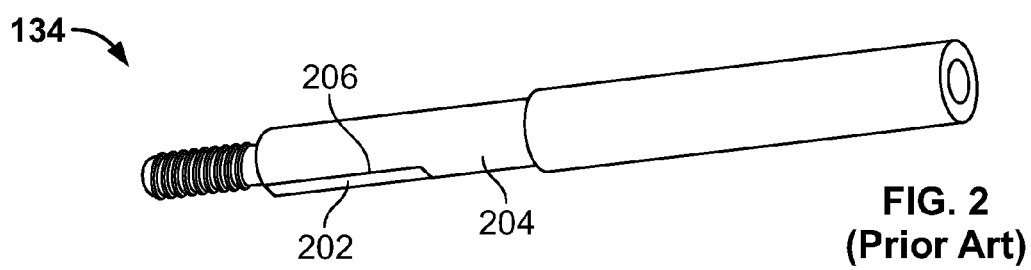
FIG. 2 depicts a stem used to implement the known internal valve of FIG. 1.

Turning briefly to FIG. 2, as discussed above, due to manufacturing tolerances, the stem 134 of the known internal valve 100 may rub against the aperture 154 (FIG. 1) as the stem 134 and/or the poppet 104 (FIG. 1) move to control the fluid flow through the internal valve 100 (FIG. 1). For example, the cut-away portion or groove 202 has edges 206 that may wear a groove(s) in the surfaces forming the aperture 154 (FIG. 1), which decreases the useful life of the poppet 104 (FIG. 1) and/or increases the rate at which maintenance must be performed on the internal valve 100 (FIG. 1). Additionally, the engagement between the edges 206 and the surfaces forming the aperture 154 (FIG. 1) may cause the plug 140 (FIG. 1) and/or the poppet 104 (FIG. 1) to become stuck in an open position enabling fluid to continue to flow through the internal valve 100 (FIG. 1). In contrast, providing the poppet 302 with the plurality of fluid flow channels 324, enables the stem 304 to have a cylindrical body, which eliminates the problems encountered with the known internal valve 100 (FIG. 1).

Once the fluid pressure is equalized across the internal valve 100 and/or between the other chamber (e.g., a hose, a pipeline, tank, etc. coupled to the second opening 116) and the chamber of the valve, the internal valve 100 may be fully opened. Specifically, the external lever 126 (FIG. 1) may be rotated to position the cam 128 (FIG. 1) at a high-point, which moves the stem 304 and disengages the first seating surface 326 from the body of the valve to enable fluid to flow from the other chamber, hose, pipeline, etc. through, for example, the first opening 114 of FIG. 1.

Turning now to FIG. 4, if the fluid flow increases to a magnitude greater than a predetermined fluid flow rate (e.g., an excess flow limit), a force exerted by the fluid flow against an external surface 404 of the poppet 302 overcomes a force exerted by the second biasing element 314 and causes the first seating surface 326 to reengage the body of the valve even though the cam 128 (FIG. 1) is positioned at the high-point. In this position, while the first seating surface 326 of the poppet 302 engages the body of the valve, the plug 306 is at a distance from the second seating surface 328 and a surface 406 of the spring seat 310 engages a surface 408 of the sliding member 308 to control fluid flow through the valve. Specifically, the engagement between the surface 406 of the spring seat 310 and the surface 408 of the sliding member 308 limits the fluid flow through the plurality of fluid flow channels 324 to be at or below a leakage rate of, for example, an effective aperture corresponding to a number 60 drill size. However, other leakage rates and/or aperture sizes may be used to suit the needs of a given application.

The sliding member 308 has an exterior surface 410 that slidably and sealingly engages a surface 412 of the bore 322. If the stem 304 further extends after the surface 406 of the spring seat 310 engages the surface 408 of the sliding member 308, the sliding member 308 moves along with the stem 304 and the spring seat 310 within the bore 322. As the stem 304 retracts and the surface 406 of the spring seat 310 moves away from the body 318, the first biasing element 312 moves the sliding member 308 away from the body 318 and toward the plate 316.

To install (e.g., retrofit) the example assembly 300 on the known internal valve 100 (FIG. 1), initially, the fluid pressure is reduced (e.g., drained) from the chamber or tank and the internal valve 100 (FIG. 1) is then unscrewed from the chamber or tank. The bonnet assembly 106 (FIG. 1) is then removed from the internal valve 100, and the plug 140 is unthreaded from the stem 134 (FIG. 1) to remove the poppet 104 (FIG. 1). The stem assembly 132 is then removed from the internal valve 100 (FIG. 1).

To install the example assembly 300 on the internal valve 100, the first spring seat 142 (FIG. 1) is threaded onto the stem 304 and the first spring 136 (FIG. 1) and the second spring seat 146 (FIG. 1) are positioned around the stem 304. The stem 304 is then guided through the opening 151 (FIG. 1) of the guide bracket 150 (FIG. 1) and the spring seat 310 is positioned on the stem 304 adjacent the stepped portion 342. Next, the second biasing element 314 is positioned around the stem 304 adjacent the first surface 340, and the stem 304 is then guided through the aperture 320 that includes the first biasing element 312 and the sliding member 308 positioned within the bore 322 by the plate 316 (e.g., the lip 319 of the plate 316). The plug 306 is then positioned on the stem 304 and the nut 309 is threaded onto the threaded end 307 of the stem 304 to position the plug 306 between the nut 309 and the body 318. The bonnet assembly 106 (FIG. 1) may then be reattached to the internal valve 100 (FIG. 1).

Figure 5:
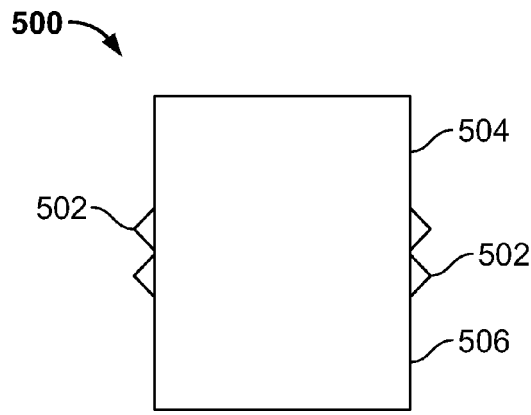
FIG. 5 depicts an alternative example sliding member that may be used to implement the poppet and excess flow valve of FIG. 3.

FIG. 5 depicts an example symmetrical sliding member 500 that may be used to implement the example assembly 300 of FIG. 3. The symmetrical sliding member 500 is similar to the sliding member 308 of FIG. 3. The symmetrical sliding member 500 includes an exterior surface 502 that slidably and sealingly engages the surface 412 (FIG. 4) of the bore 322 (FIG. 4). Additionally, the symmetrical sliding member 500 includes a first portion 504 and a second portion 506. The first portion 504 is positioned on an opposite side of the exterior surface 502 relative to the second portion 506. The first portion 504 is substantially the same size as the second portion 506. Forming the first portion 504 substantially the same size as the second portion 506 increases the ease of manufacture of the symmetrical sliding member 500. Additionally, forming the first portion 504 to be substantially the same size as the second portion 506 decreases the likelihood that the symmetrical sliding member 500 is installed incorrectly (e.g., upside down) within the bore 322 of the poppet 302 during assembly.

Figure 6:
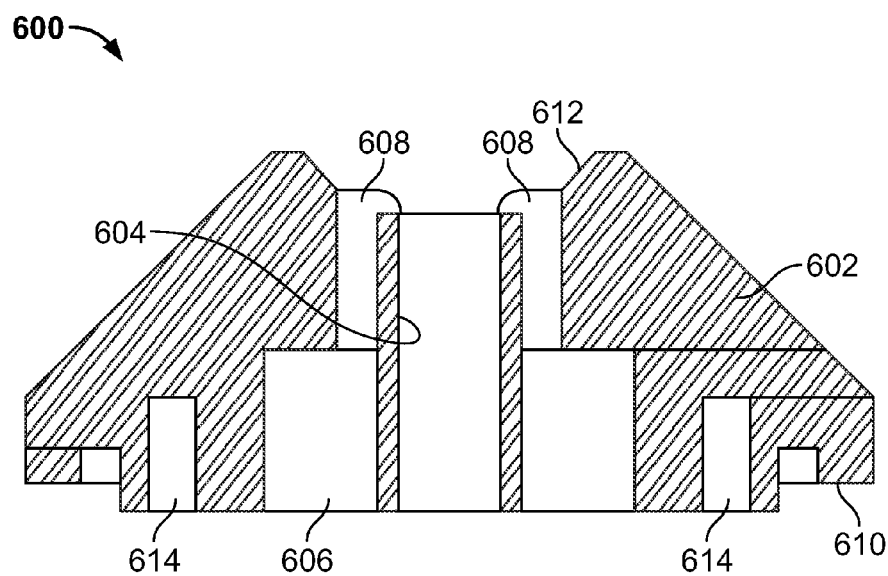
FIG. 6 depicts an example poppet that may be used to implement the example poppet and excess flow valve of FIG. 3.

FIG. 6 depicts an example fluid flow control member, poppet or poppet apparatus 600 that may be used to implement the example assembly 300 of FIG. 3. The poppet 600 is similar to the poppet 302 of FIG. 3. The poppet 600 has a body 602 that defines an aperture 604, a bore 606 that is coaxially aligned with the aperture 604, a plurality of fluid flow channels 608, a first seating surface 610 and a second seating surface 612 that is opposite the first seating surface 610. Additionally, the body 602 defines a plurality of openings, cavities or crevices 614 that reduce the amount of material used during casting to make the overall weight of the poppet 600 substantially the same as the weight of the known poppet 104 of FIG. 1.

Although the poppet 302 (FIG. 3) is depicted as implemented in connection with the assembly 300 (FIG. 3) for use with an internal valve, in other example implementations, the poppets 302 or 600 or any other example apparatus described herein may be implemented in connection with any other suitable fluid control device such as, for example, emergency shut off valves.

Figure 7:
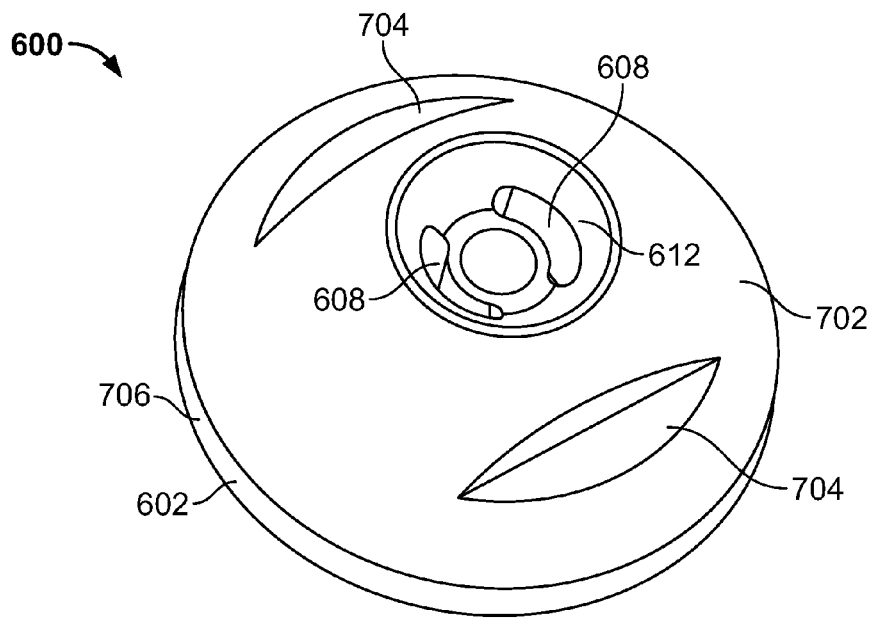
FIG. 7 depicts a top view of the example poppet of FIG. 6.

FIG. 7 depicts an external surface 702 (e.g., a tapered external surface) of the example poppet 600, the second seating surface 612 and the plurality of fluid flow channels 608. While two fluid flow channels 608 are depicted in the example poppet 600, any other number of fluid flow channels (e.g., 1, 2, 3, 4, etc.) having any other suitable shape (e.g., circular, oval, triangular, rectangular, etc.) or size may be used instead. The external surface 702 defines a plurality of substantially flat step-shaped surfaces 704 that may be advantageously used to enable gripping the poppet 600 in, for example, a bench vice or any other suitable holding device. While the poppet 600 includes two step-shaped surfaces 704 positioned on the external surface 702, the poppet 600 may include any number of step-shaped surfaces (e.g., 1, 2, 3, 4, etc.) on any suitable portion of the poppet 600, such as a surface 706 of the poppet 600.

In operation, the poppet 600 may be exposed to substances and/or chemicals that corrode, for example, the gasket or o-ring 327 (FIG. 3) of the first seating surface 610, which prevents a substantially bubble tight seal between the first seating surface 610 and the body of the valve. To replace the gasket or o-ring 327 (FIG. 3), the poppet 600 is removed from the valve as described above and the plate 316 (FIG. 3) may then be removed from the body 602. Unfortunately, during removal of the plate 316 (FIG. 3), due to exposure to the substances and/or chemicals, a plurality of fasteners (not shown) (e.g., screws) that couple the plate 316 (FIG. 3) to the body 602 may break off within the body 602.

To remove the damaged fastener(s), a pilot hole (not shown) is drilled into the fastener, an end (not shown) of an extractor (not shown) is tapped into the pilot hole, and then the extractor is turned (e.g., counter-clockwise) to remove the damaged fastener. If a technician attempts to clamp the known poppet 104 of FIG. 1 between the jaws of a vice, any contact point on the external surface 162 of the poppet 104 (FIG. 1) has a circular cross-section, which only enables each jaw of the vice to engage a single contact point on the poppet 104 (FIG. 1), thereby enabling the poppet 104 (FIG. 1) to move and/or slip while a damaged faster is extracted from the poppet 104 (FIG. 1) and/or the gasket or o-ring 327 (FIG. 3) is replaced. In contrast, the flat surfaces 704 of the example poppet 600 are substantially parallel to one another. The parallel alignment of the flat surfaces 704 enables the jaws of a vice to engage numerous contact points on the flat surfaces 704 and, thus, securely position the poppet 600 between the jaws of the vice while a damaged faster is extracted, the gasket or o-ring 327 is replaced and/or any other procedure is performed while the poppet 600 is secured between the jaws of the vice. After the plate 316 (FIG. 3) is removed from the body 602, the gasket or o-ring 327 is replaced and the plate 316 may then be recoupled to the body 602.

Figure 8:
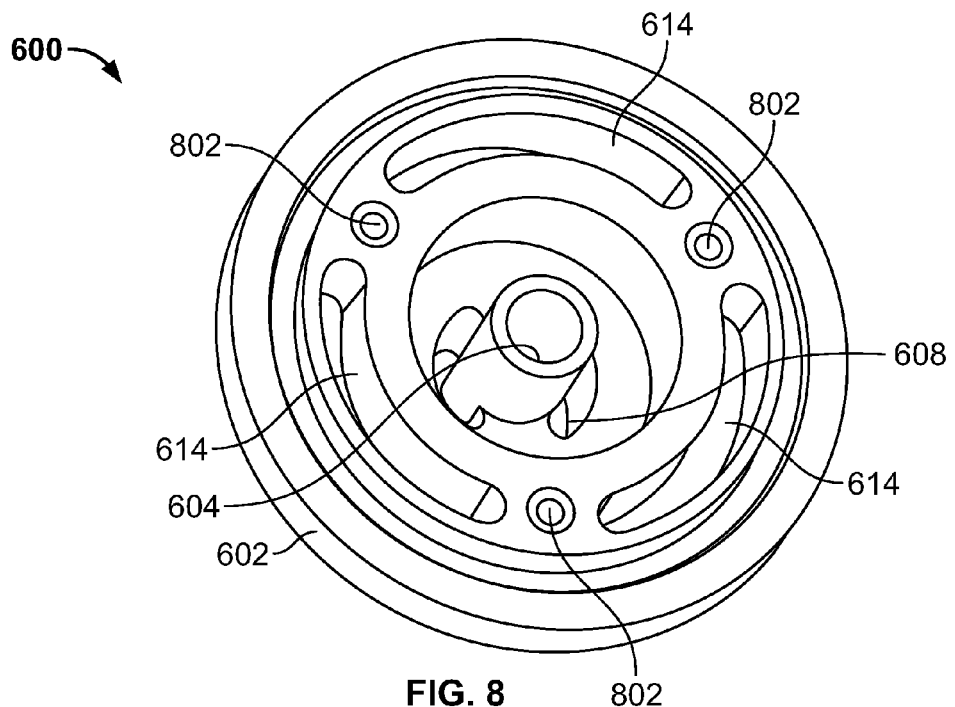
FIG. 8 depicts a bottom view of the example poppet of FIG. 6.

FIG. 8 depicts a plurality of threaded holes 802 that each receive one of the plurality of fasteners to couple the plate 316 (FIG. 3) to the body 602. Additionally, FIG. 8 depicts the plurality of fluid flow channels 608, the plurality of openings, cavities or crevices 614 and the aperture 604 that is sized to guide the stem 304 (FIG. 3) relative to the poppet 600.

Figure 9A:
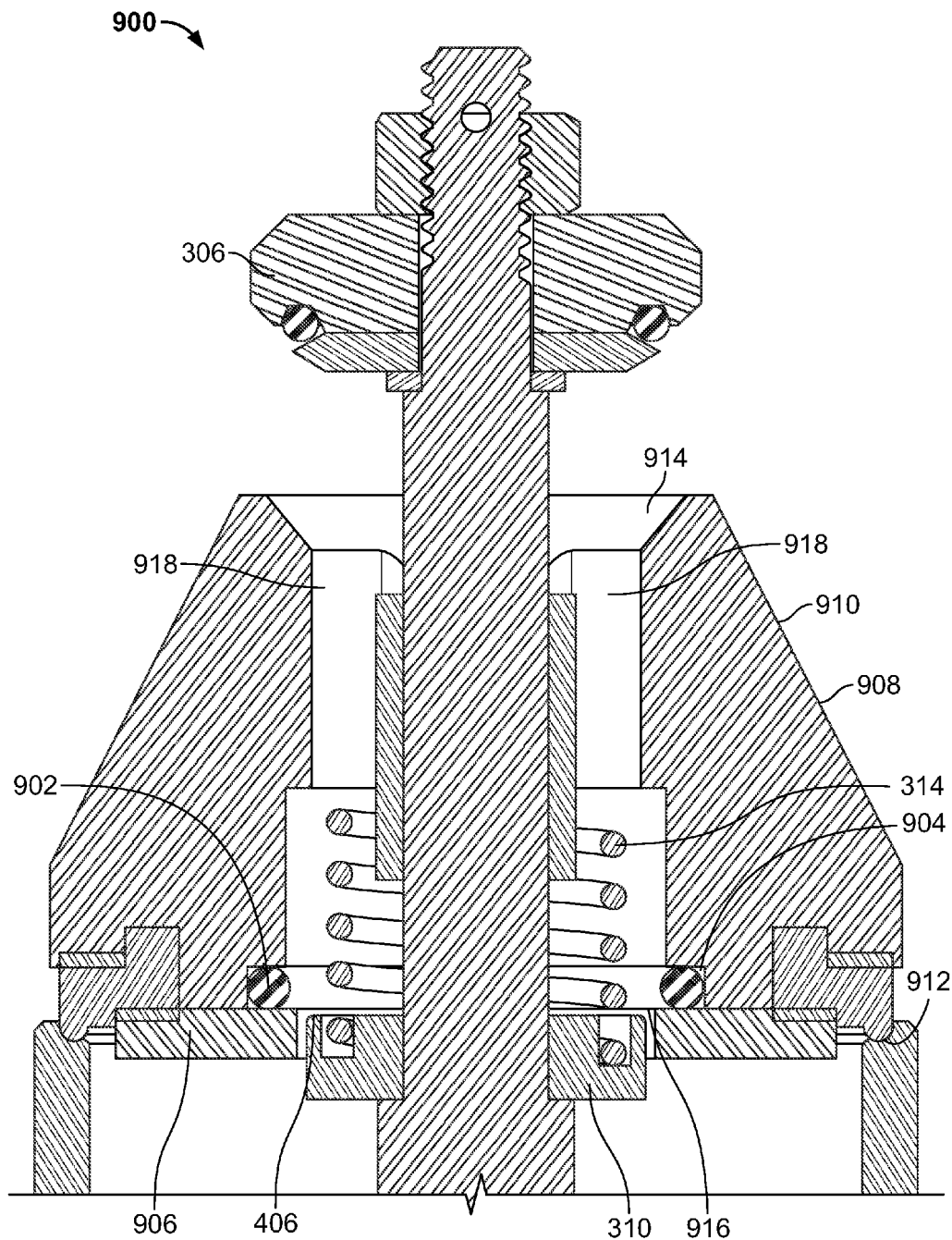
FIG. 9A depicts an example alternative configuration that may be used to implement the example poppet and excess flow valve of FIG. 3.

FIG. 9A depicts an alternative example configuration 900 in which a seal 902 (e.g., a gasket or o-ring) is positioned within a bore or groove 904 between a plate 906 and a poppet or poppet apparatus 908. The plate 906 is coupled to the poppet 908 via a plurality of fasteners (not shown). In operation, as discussed above, if the fluid flow increases to a magnitude greater than a predetermined fluid flow rate (e.g., an excess flow limit), a force exerted by the fluid flow against an external surface 910 of the poppet 908 overcomes a force exerted by the second biasing element 314 and causes a first seating surface 912 to reengage the body of the valve even though the cam 128 (FIG. 1) is positioned at the high-point. In this position, while the first seating surface 912 of the poppet engages the body of the valve, the plug 306 is at a distance from a second seating surface 914 and the surface 406 of the spring seat 310 engages a surface 916 of the seal 902 to control fluid flow through the valve. Specifically, the engagement between the surface 406 of the spring seat 310 and the surface 916 of the seal 902 limits the fluid flow through a plurality of fluid flow channels 918 to be at or below a leakage rate of, for example, an effective aperture corresponding to a number 60 drill size.

Figure 9B:
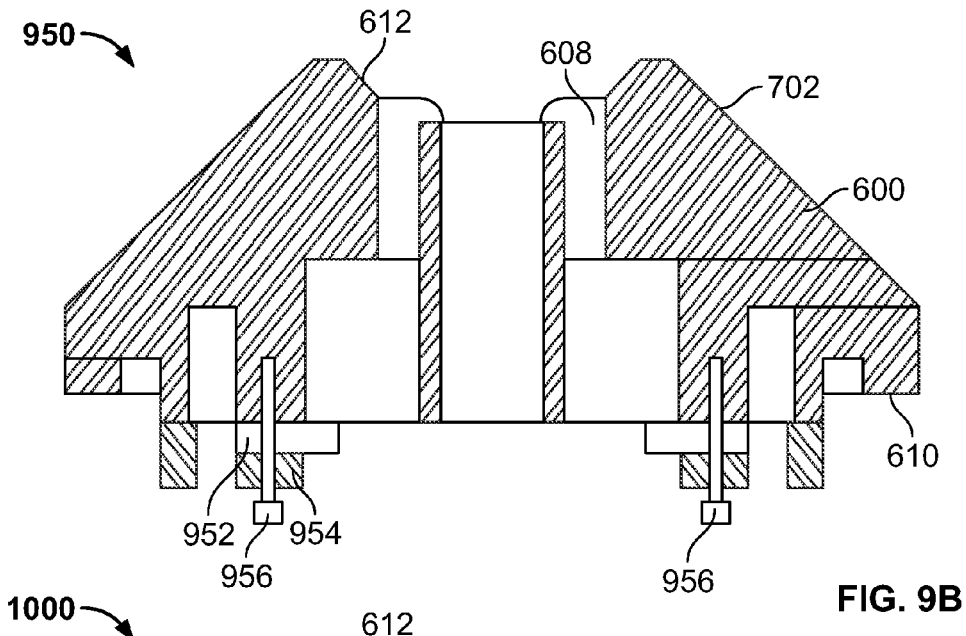
FIG. 9B depicts another example alternative configuration that is similar to the example depicted in FIG. 9A and which may be used to implement the example poppet and excess flow valve of FIG. 3.

FIG. 9B depicts an alternative example configuration 950 in which a seal 952 (e.g., a gasket or o-ring) is positioned between a plate 954 and the poppet 600. The plate 954 is coupled to the poppet 600 via a plurality of fasteners 956. The operation of the example configuration 950 is substantially similar to the operation of the example configuration 900 and, thus, the operation of the example configuration 950 will not be repeated here.

Figure 10:
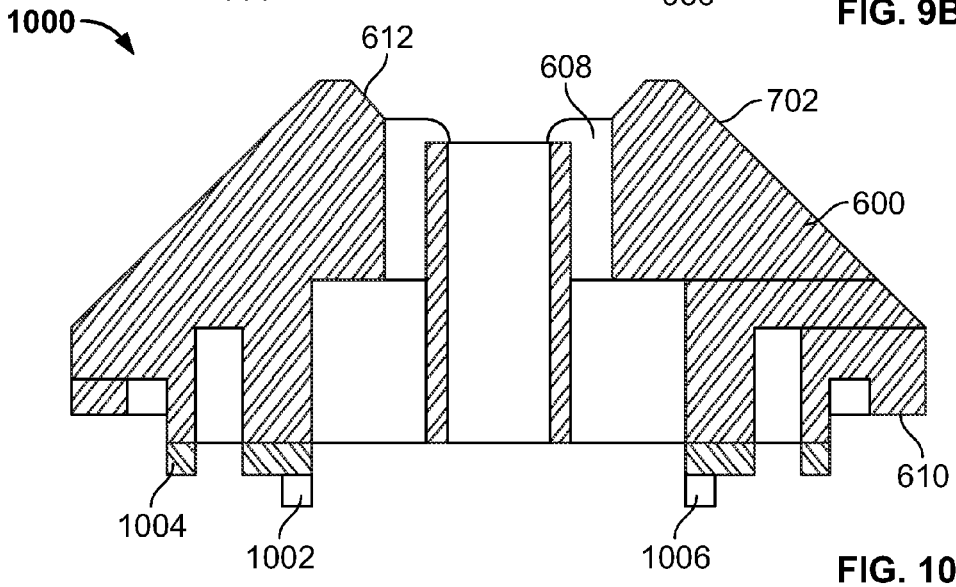
FIG. 10 depicts another example alternative configuration that may be used to implement the example poppet and excess flow valve of FIG. 3.

FIG. 10 depicts an alternative example configuration 1000 in which a seal 1002 (e.g., a gasket or o-ring) is coupled and/or molded to a plate 1004. In operation, if the fluid flow increases to a magnitude greater than a predetermined fluid flow rate (e.g., an excess flow limit), a force exerted by the fluid flow against the external surface 702 of the poppet 600 overcomes a force exerted by the second biasing element 314 (FIG. 3) and causes the first seating surface 610 to reengage the body of the valve even though the cam 128 (FIG. 1) is positioned at the high-point. In this position, while the first seating surface 610 of the poppet 600 engages the body of the valve, the plug 306 (FIG. 3) is at a distance from the second seating surface 612 and the surface 406 (FIG. 4) of the spring seat 310 (FIG. 3) engages a surface 1006 of the seal 1002 to control fluid flow through the valve. Specifically, the engagement between the surface 406 (FIG. 4) of the spring seat 310 (FIG. 3) and the surface 1006 of the seal 1002 limits the fluid flow through the plurality of fluid flow channels 608 to be at or below a leakage rate of, for example, an effective aperture corresponding to a number 60 drill size.

Figure 11:
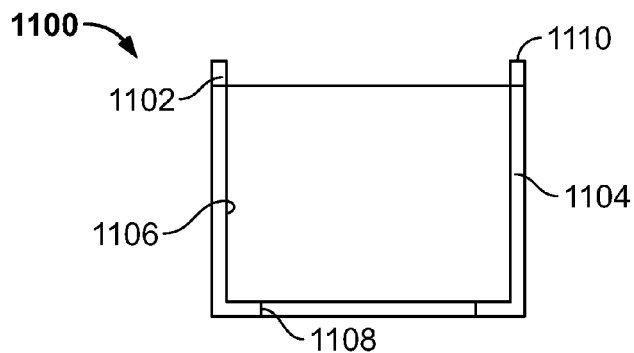
FIG. 11 depicts an example spring seat that may be used to implement the poppet and excess flow valve of FIG. 3.

FIG. 11 depicts an example spring seat 1100 that includes a seal 1102 to engage a surface and/or the lip 319 (FIG. 3) of the plate 316 (FIG. 3). The spring seat 1100 has a body 1104 that defines a bore 1106 and an opening 1108. The diameter of the opening 1108 substantially corresponds to the diameter of the stem 304 (FIG. 3).

In operation, if the fluid flow increases to a magnitude greater than a predetermined fluid flow rate (e.g., an excess flow limit), a force exerted by the fluid flow against the external surface 404 (FIG. 4) of the poppet 302 (FIG. 3) overcomes a force exerted by the second biasing element 314 (FIG. 3) and causes the first seating surface 326 to reengage the body of the valve even though the cam 128 (FIG. 1) is positioned at the high-point. In this position, while the first seating surface 326 of the poppet 302 (FIG. 3) engages the body of the valve, the plug 306 (FIG. 3) is at a distance from the second seating surface 328 (FIG. 3) and a surface 1110 of the seal 1102 engages the surface and/or the lip 319 (FIG. 3) of the plate 316 (FIG. 3) to control fluid flow through the valve. Specifically, the engagement between the surface 1110 of the seal 1102 and the surface and/or the lip 319 (FIG. 3) limits the fluid flow through the plurality of fluid flow channels 324 (FIG. 3) to be at or below a leakage rate of, for example, an effective aperture corresponding to a number 60 drill size.

Figure 12:
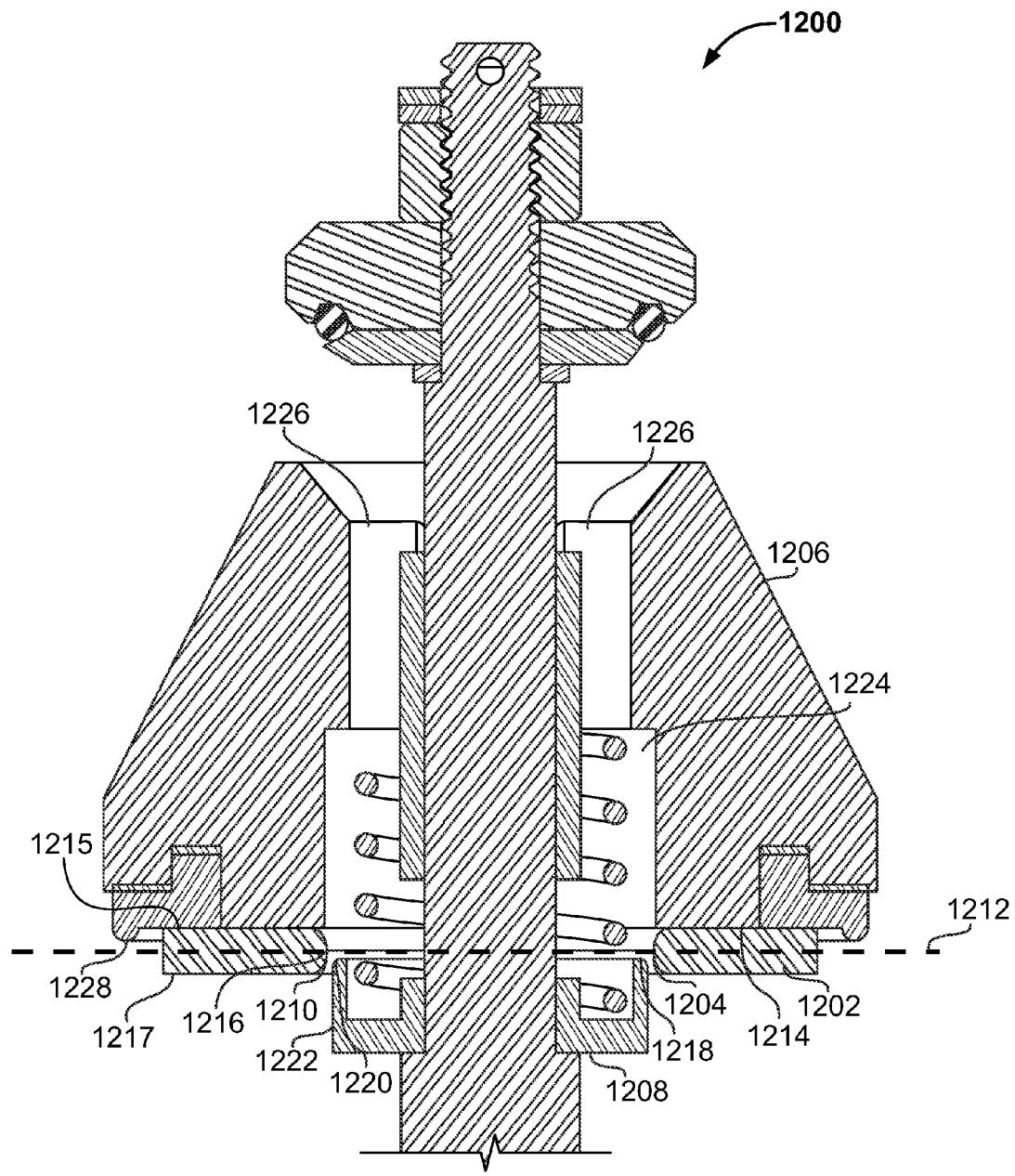
FIG. 12 depicts a portion of another example poppet and excess flow valve assembly.

FIG. 12 depicts a portion of an example poppet and excess flow valve assembly or apparatus 1200 that is similar to the example poppet and excess flow valve assembly 300 (FIGS. 3 and 4), the example poppet 600 (FIGS. 6-8) and the example configurations 900, 950 and 1000 (FIGS. 9A, 9B and 10) described above. However, in contrast to the examples described above, the example poppet and excess flow valve assembly 1200 includes a plate 1202 (e.g., a main disc retainer) that defines an opening 1204 sized to substantially limit the fluid flow through a poppet or poppet apparatus 1206 when a spring seat 1208 is positioned proximate and/or adjacent the opening 1204. Additionally, the plate 1202 includes a curved surface 1210 that surrounds the opening 1204 to align the spring seat 1208 relative to the opening 1204. In some examples, the curved surface 1210 may be symmetrical relative to a lateral axis 1212 of the plate 1202, which decreases the likelihood that the plate 1202 is installed incorrectly (e.g., upside down) relative to a surface 1214 of the poppet 1206. Specifically, the plate 1202 may be coupled to the poppet 1206 such that a first surface 1215 of the plate 1202 is adjacent the surface 1214 or a second surface 1217 of the plate 1202 is adjacent the surface 1214 of the poppet 1206. Additionally or alternatively, in some examples, an end 1218 of the spring seat 1208 may include a curved surface 1220 to further align the spring seat 1208 relative to the opening 1204.

The opening 1204 may be sized such that there is a distance less than approximately 0.2 millimeters or approximately 0.09 millimeters between an innermost portion 1216 of the curved surface 1210 and an exterior surface 1222 of the spring seat 1208 when the spring seat 1208 is partially positioned in a bore 1224 defined by the poppet 1206. Generally, as the spring seat 1208 moves toward and/or through the opening 1204, the fluid flow through a plurality of fluid flow channels 1226 decreases. Such an approach adequately controls the fluid flow through the plurality of fluid flow channels 1226 when, as described above, the fluid flow increases to a magnitude greater than a predetermined fluid flow rate (e.g., an excess flow limit) and a first seating surface 1228 of the poppet 1206 reengages the body of the valve even though the cam 128 (FIG. 1) is positioned at the high-point.

Figure 13:
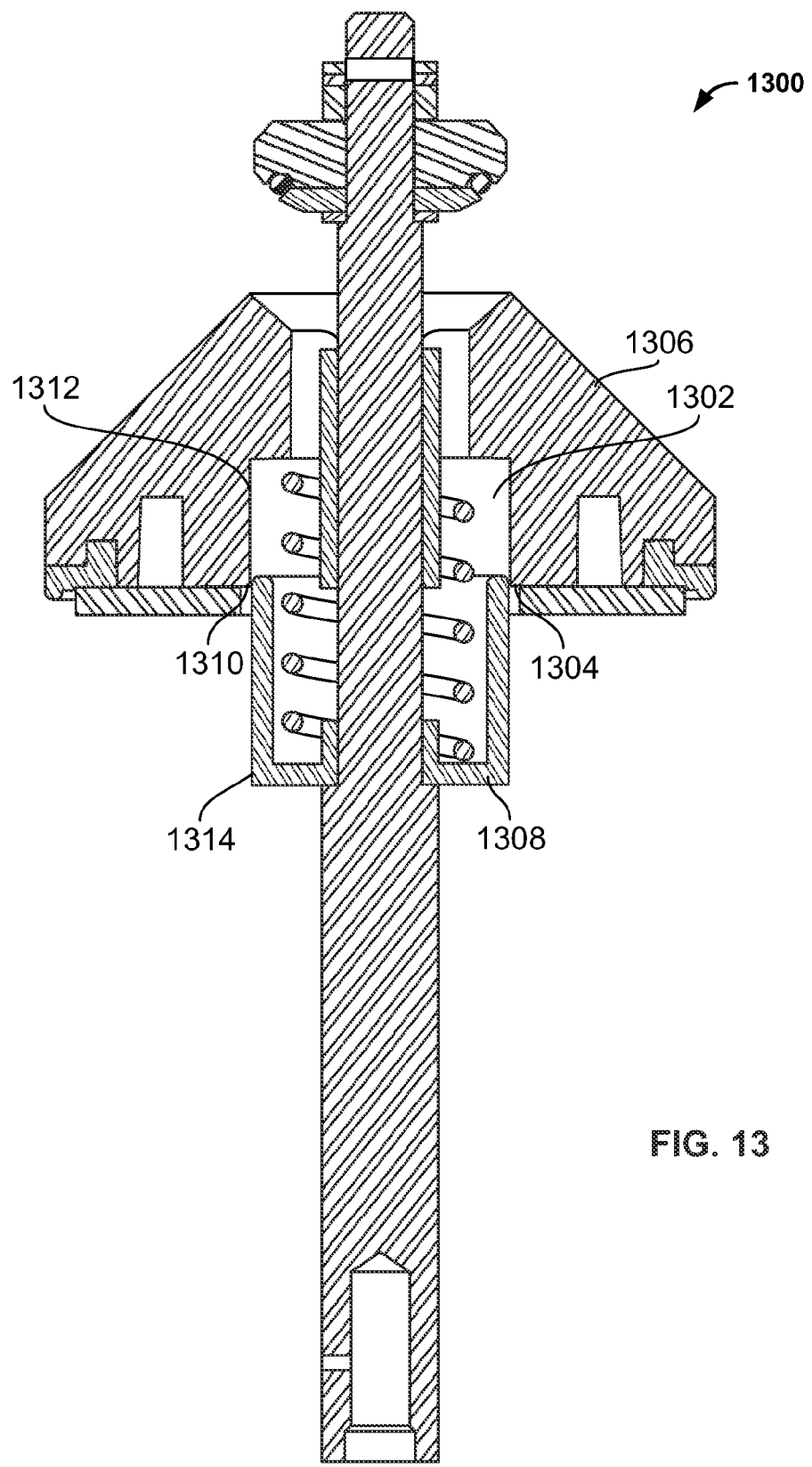
FIG. 13 depicts a portion of another example poppet and excess flow valve assembly.

FIG. 13 depicts a portion of an example poppet and excess flow valve assembly or apparatus 1300 that is similar to the example poppet and excess flow valve assembly 1200 of FIG. 12. However, in contrast, the example poppet and excess flow valve assembly 1300 includes a bore 1302 that defines an opening 1304 and which is sized to substantially limit the fluid flow through a poppet or poppet apparatus 1306 when a spring seat 1308 is positioned proximate and/or adjacent the bore 1302 and/or the opening 1304. Additionally, the bore 1302 includes a curved surface 1310 that surrounds the opening 1304 to align the spring seat 1308 relative to the opening 1304.

The bore 1302 and/or the opening 1304 may be sized such that there is a distance less than approximately 0.2 millimeters or approximately 0.09 millimeters between a surface 1312 of the bore 1302 and an exterior surface 1314 of the spring seat 1308 when the spring seat 1308 is at least partially positioned in the bore 1302.

Figure 14:
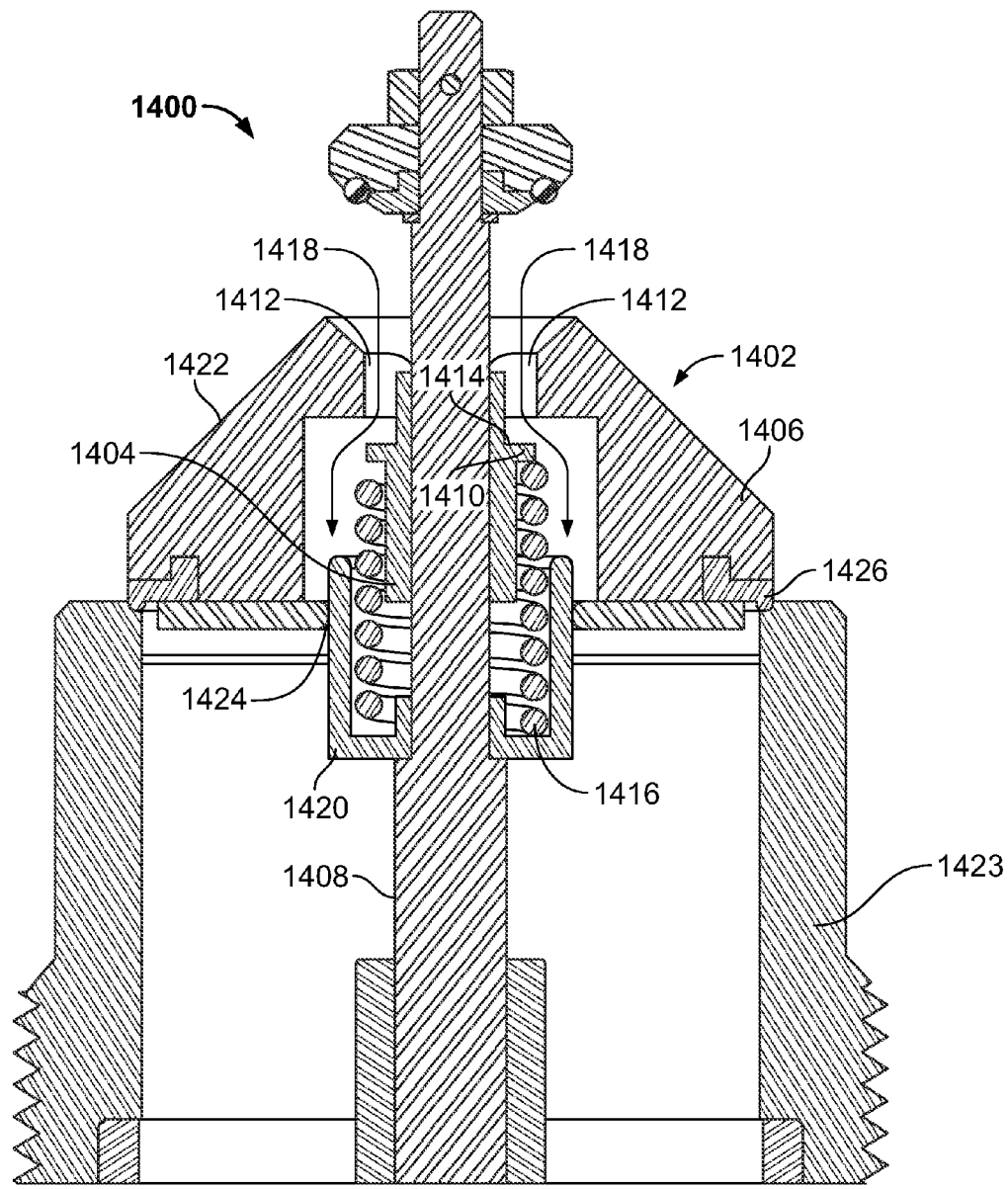
FIG. 14 depicts a portion of an internal valve and example poppet and excess flow valve assembly.

FIG. 14 depicts a portion of an example valve 1400 having an example poppet and excess flow valve assembly or apparatus 1402 that is similar to the example poppet and excess flow valve assemblies 1200 (FIG. 12) and 1300 (FIG. 13) described above. However, in contrast to the examples described above, the example poppet and excess flow valve assembly 1402 includes a flow diverter or spring seat 1404 that is integrally coupled to a poppet or poppet apparatus 1406. The flow diverter 1404 at least partially surrounds and is coaxially aligned with a shaft 1408 and includes a lip or shoulder 1410 that is inline with and/or proximate a plurality of fluid flow channels 1412.

Generally, as fluid flows through the plurality of fluid flow channels 1412, the fluid engages a surface 1414 of the shoulder 1410, thereby diverting and/or controlling the flow of fluid around a spring or biasing element 1416 in a direction generally represented by arrows 1418. Positioning the flow diverter 1404 inline with the plurality of fluid flow channels 1412 substantially prevents the flow of fluid from affecting (e.g., compressing, acting on) the spring 1416 positioned between the flow diverter 1404 and a spring seat 1420. Therefore, the spring 1416 may only be compressed by the force exerted by the fluid flow against an external surface 1422 of the poppet 1406 and not by the fluid flow through the plurality of fluid flow channels 1412.

In operation, as the force exerted on the external surface 1422 moves the poppet 1406 toward a body 1423 of the valve 1400, the spring seat 1420 moves toward and/or through an opening 1424, thereby decreasing the fluid flow through the plurality of fluid flow channels 1412. Such an approach adequately controls the fluid flow through the plurality of fluid flow channels 1412 when, as described above, the fluid flow increases to a magnitude greater than a predetermined fluid flow rate (e.g., an excess flow limit) and a first seating surface 1426 of the poppet 1406 reengages the body 1423 of the valve 1400 even though the cam 128 (FIG. 1) is positioned at the high-point.

Figure 15:
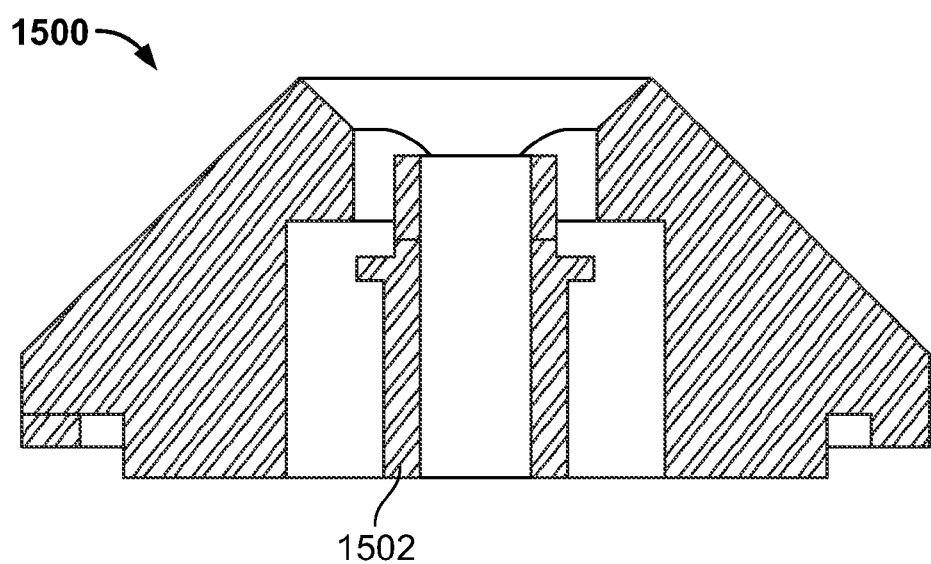
FIG. 15 depicts an example poppet.

FIG. 15 depicts another example poppet or poppet apparatus 1500 that includes an example flow diverter or spring seat 1502 that is substantially similar to the example poppet 1406 of FIG. 14. As such, a description of the example poppet 1500 will not be repeated here.

Figure 16:
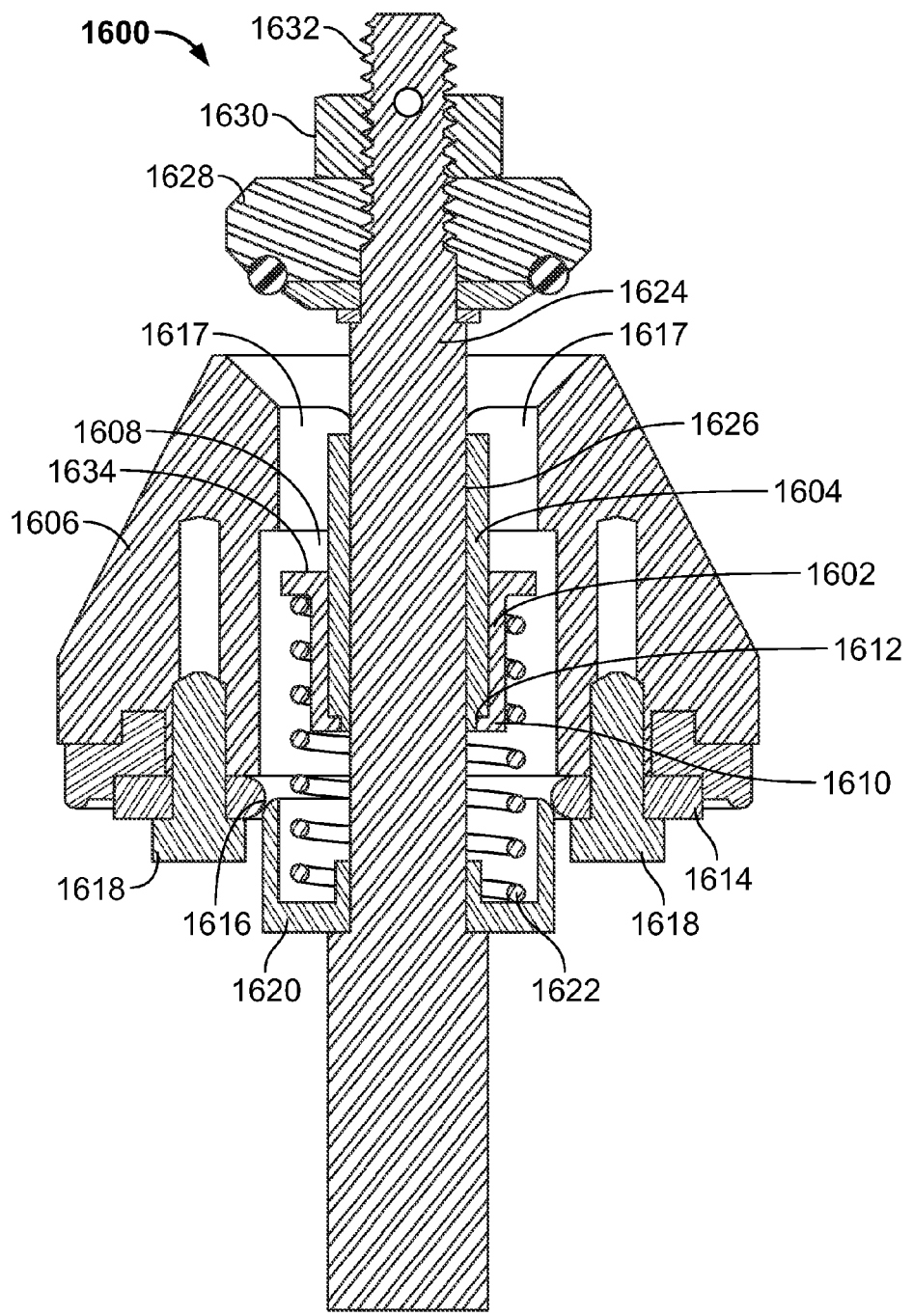
FIG. 16 depicts a portion of another example poppet and excess flow valve assembly.

FIG. 16 depicts an example poppet and excess flow valve assembly or apparatus 1600 that is similar to the example poppet and excess flow valve assembly 1402 (FIG. 14) described above. However, in contrast to the examples described above, the example poppet and excess flow valve assembly 1600 includes a flow diverter or spring seat 1602 that surrounds and engages an elongated member 1604 of a poppet or poppet apparatus 1606. In some examples, a poppet apparatus may include both the poppet 1606 and the flow diverter 1602. Such an approach may decrease the complexity of producing the example poppet and excess flow valve assembly 1600.

To assemble the example poppet and excess flow valve assembly 1600, the flow diverter 1602 is positioned within a bore 1608 of the poppet 1606 such that an inner shoulder 1610 of the flow diverter 1602 engages an end 1612 of the elongated member 1604 to secure the flow diverter 1602 relative to the poppet 1606. A plate 1614 having an opening 1616 sized to control the flow of fluid through a plurality of fluid flow channels 1617, as described above, may then be coupled to the poppet 1606 via a plurality of fasteners 1618. A spring seat 1620 and a spring or biasing element 1622 may then be positioned around a stem 1624, and the stem 1624 including the spring seat 1620 and the spring 1622 are then guided through an aperture 1626 defined by the poppet 1606. A plug 1628 is then positioned on the stem 1624 and a nut 1630 is threaded onto a threaded end 1632 of the stem 1624 to position the plug 1628 between the nut 1630 and the poppet 1606.

As discussed above, in operation, as fluid flows through the plurality of fluid flow channels 1617, the fluid engages a surface 1634 of the flow diverter 1602, thereby diverting and/or controlling the flow of fluid around the spring 1622.

Figure 17:
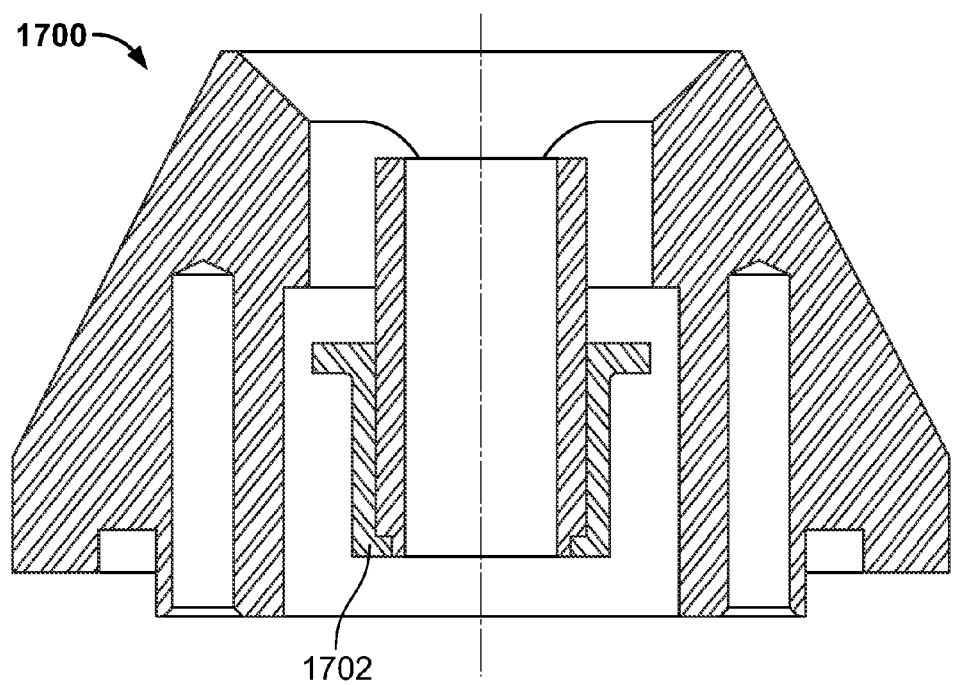
FIG. 17 depicts an example poppet.

FIG. 17 depicts another example poppet or poppet apparatus 1700 that includes an example flow diverter or spring seat 1702 that is substantially similar to the example poppet 1606 and the flow diverter 1602 of FIG. 16. As such, a description of the example poppet 1700 will not be repeated here.

As set forth herein, an example poppet apparatus for use with an internal valve includes first and second opposing seating surfaces to control fluid flow through the internal valve. The example poppet apparatus includes an aperture to receive a stem of the internal valve. The aperture is positioned between the first and second seating surfaces. The example poppet apparatus includes a flow diverter to divert fluid flow through the poppet apparatus to substantially prevent the fluid flow from compressing a spring to be at least partially positioned in the poppet apparatus. The aperture is to extend through the flow diverter.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A poppet apparatus for use with an internal valve, comprising:
   first and second opposing seating surfaces to control fluid flow through the internal valve;
   an aperture to receive a stem of the internal valve, the aperture positioned between the first and second seating surfaces; and
   a flow diverter at least partially defining a flow channel and the aperture, the flow diverter comprising a third surface and a fourth surface opposite the third surface, the third surface to be engaged by an end of a spring, the spring to be at least partially positioned in the poppet apparatus and to at least partially surround the flow diverter, the fourth surface to divert fluid flow through the flow channel and substantially around the end of the spring to substantially prevent the fluid flow from compressing the spring.

2. The poppet apparatus as defined in claim 1, wherein the flow diverter includes a shoulder proximate the flow channel, wherein the shoulder comprises the third and fourth surfaces.

3. The poppet apparatus as defined in claim 2, wherein the flow channel is to fluidly couple a chamber of the internal valve to another chamber.

4. The poppet apparatus as defined in claim 1, wherein the flow diverter is integrally coupled to the poppet apparatus.

5. The poppet apparatus as defined in claim 1, further comprising a plate coupled to the poppet apparatus, wherein the plate defines an opening sized to limit the fluid flow through the poppet apparatus when a spring seat coupled to the stem is proximate the opening.

6. The poppet apparatus as defined in claim 5, further comprising a curved surface that surrounds the opening to align the spring seat relative to the opening.

7. The poppet apparatus as defined in claim 6, wherein the curved surface is symmetrical relative to a lateral axis of the plate to enable the plate to be coupled to the poppet apparatus via either a first side of the plate or a second side of the plate.

8. The poppet apparatus as defined in claim 5, wherein the opening is sized to provide a distance of approximately 0.09 millimeters between a surface adjacent the opening and an exterior surface of the spring seat when the spring seat is positioned adjacent the opening.

9. A poppet apparatus for use with an internal valve, comprising:
- a first body having a first seating surface to sealingly engage a second body of the internal valve, wherein the first body defines:
  - a second seating surface opposite the first seating surface to sealingly engage a plug of the internal valve;
  - an aperture to receive a stem of the internal valve, the aperture positioned between the first and second seating surfaces;
  - a bore at least partially concentric with the aperture; and
  - a fluid flow channel positioned between the aperture and the second seating surface, the fluid flow channel and the aperture being concentric along a length of the fluid flow channel, wherein the fluid flow channel is different than the aperture; and
- a plate coupled to the poppet apparatus, wherein at least one of the plate or the bore define an opening sized to substantially limit fluid flow through the poppet apparatus when a spring seat coupled to the stem is positioned adjacent the opening.

10. The poppet apparatus as defined in claim 9, further comprising a flow diverter at least partially defining the fluid flow channel, the flow diverter comprising a third surface and a fourth surface opposite the third surface, the third surface to be engaged by an end of a spring, the spring to be at least partially positioned within the bore and to at least partially surround the flow diverter, the fourth surface to divert the fluid flow through the fluid flow channel and substantially around the end of the spring to substantially prevent the fluid flow from compressing the spring.

11. The poppet apparatus as defined in claim 10, wherein the flow diverter includes a shoulder proximate the fluid flow channel, wherein the shoulder comprises the third and fourth surfaces.

12. The poppet apparatus as defined in claim 9, further comprising a curved surface that surrounds the opening to align the spring seat relative to the opening.

13. The poppet apparatus as defined in claim 9, wherein the opening is sized to provide a distance of approximately 0.09 millimeters between a surface adjacent the opening and an exterior surface of the spring seat when the spring seat is positioned adjacent the opening.

14. An internal valve, comprising:
- a body that defines a chamber, wherein the body includes external threads to threadably engage another body;
- a stem assembly having a biasing element, wherein the stem assembly is to exert a force on a poppet to urge the poppet toward the body to control fluid flow through the internal valve; wherein the poppet comprises:
  - a first seating surface opposite a second seating surface;
  - an aperture to receive a stem of the internal valve, the aperture positioned between the first and second seating surfaces;
  - a bore at least partially concentric with the aperture; and
  - a fluid flow channel positioned between the aperture and the first seating surface of the poppet, the fluid flow channel and the aperture being concentric along a length of the fluid flow channel, wherein the fluid flow channel is different than the aperture; and
- a plate coupled to the poppet, wherein at least one of the plate or the bore define an opening sized to substantially limit the fluid flow through the poppet when a spring seat coupled to the stem is positioned adjacent the opening.

15. The internal valve as defined in claim 14, further comprising a flow diverter at least partially defining the fluid flow channel, the flow diverter comprising a third surface and a fourth surface opposite the third surface, the third surface to be engaged by an end of a second biasing element, the second biasing element to be at least partially positioned within the bore and to at least partially surround the flow diverter, the fourth surface to divert fluid flow through the fluid flow channel and substantially around the end of the second biasing element to substantially prevent the fluid flow from compressing the second biasing element.

16. The internal valve as defined in claim 14, further comprising a curved surface that surrounds the opening to align the spring seat relative to the opening.

17. The internal valve as defined in claim 14, wherein the opening is sized to provide a distance of approximately 0.09 millimeters between a surface adjacent the opening and an exterior surface of the spring seat when the spring seat is positioned adjacent the opening.

18. The poppet apparatus as defined in claim 10, wherein the flow diverter is to at least partially define the aperture.

* * * * *